March 29, 1927.
H. FLICK
1,622,504
METHOD OF MANUFACTURING SEMIWOOD WHEELS
Filed Dec. 17, 1921
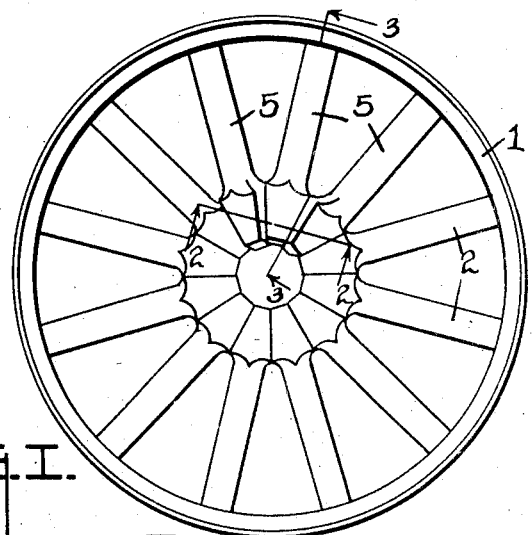
Fig. I.
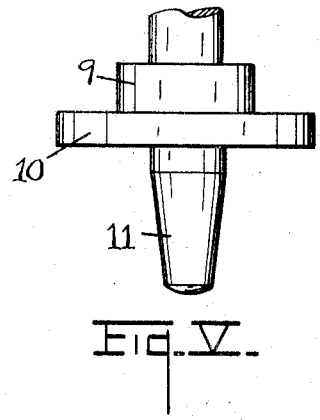
Fig. V.
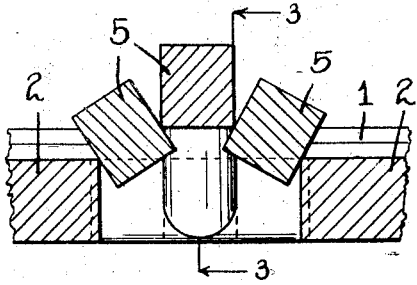
Fig. II.
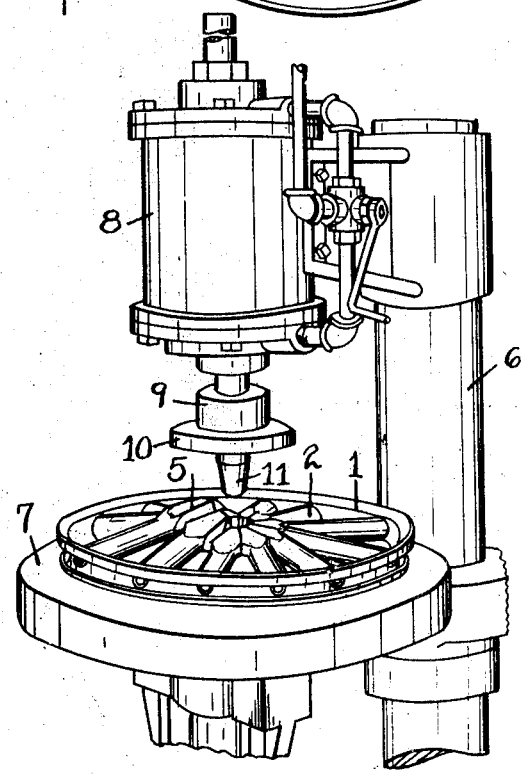
Fig. IV.
Fig. III.
Inventor
Henry Flick
By
Attorneys Patented Mar. 29, 1927.

1,622,504

UNITED STATES PATENT OFFICE.

HENRY FLICK, OF JACKSON, MICHIGAN, ASSIGNOR TO HAYES WHEEL COMPANY, OF JACKSON, MICHIGAN.

METHOD OF MANUFACTURING SEMIWOOD WHEELS.

Application filed December 17, 1921. Serial No. 523,029.

This invention relates to an improved method of manufacturing semi-wood wheels.

The object of the invention is to provide an improved and expeditious method of manufacturing such wheels.

Objects relating to details and economies of construction and operation will definitely appear from the detail description to follow.

I illustrate the method of carrying out my invention in the accompanying drawing in which:

Fig. I is a side view of a wheel in process of construction according to my improved process.

Fig. II is an enlarged detail sectional view on a line corresponding to line 2—2 of Fig. I.

Fig. III is an enlarged detail view taken on the irregular line corresponding to line 3—3 of Figs. I and II.

Fig. IV is a detail view of the press for the finishing operation with the wheel in place to be acted upon.

Fig. V is a detail view of the tapered plug for forcing the spokes into position.

In the drawing similar numerals of reference refer to similar parts throughout the several views and the sectional views are taken looking in the direction of the little arrows at the ends of the section lines.

I will consider the parts of the drawing by their numbers. 1 is a metal felly for a wheel. 2 is a wood spoke. 3 is the spoke mortise for the felly, and 4 is the tenon therefor. 5 are the tapered center head ends of the spokes.

In carrying out my invention I heat the metal felly 1 to expand the same to the fullest extent according to tire setting methods. I then insert all of the spokes within the felly except three, driving the same in securely and disposing them in their proper relation so far as possible. I then insert the three spokes, one with the hub end above the plane of the face of the wheel center and the spokes on opposite sides inserted in inclined relation beneath the same and extending partially into the space which they will occupy and in inclined relation, driving the tenons of the same as securely as possible into the mortises of the felly.

With the spokes thus disposed I place the same under a suitable press, such as that illustrated, having a standard 6, a table 7 to receive the wheel flat down with an air cylinder 8 having a ram 9 with a suitable flanged head 10 for forcing the heads of the spokes down into the recesses therefor. The tapered plug 11, detailed in Fig. V, assists in forcing the spokes into position.

It will be seen by inspection of Fig. II that they have a strong wedging action one against the other terminating in a powerful toggle action which forces the center ends of the spokes into very close engagement when the shrinking of the metal of the felly completes the formation of the wheel.

More than three spokes might be disposed in arched relation like that appearing in Fig. II and some slight result would be obtained by disposing a pair of spokes. Full and sufficient action is secured however by the arrangement of three as indicated.

Having thus described my invention, what I claim as new and desire to secure by Letters Patent, is:

1. The method of manufacturing a semi-wood wheel consisting in heating and expanding the metal felly, driving the spokes into the felly securely and arranging in the plane of the wheel with the exception of three spokes, the inner ends of which are arranged in arched relation with their tenons forced as far as possible into the mortises, and then pressing the said final spokes into position, as specified.

2. The method of manufacturing a semi-wood wheel consisting in heating and expanding the metal felly, driving the spokes into the felly securely and arranging the inner ends of a portion thereof in arched relation and then applying pressure thereto to crush the arch to the flat form, thereby compressing the inner ends of said spokes into secure relation, as specified.

In witness whereof, I have hereunto set my hand.

HENRY FLICK.